United States Patent

[11] 3,623,799

| [72] | Inventor | Michel Millodot |
| | | Providence, R.I. |
| [21] | Appl. No. | 8,846 |
| [22] | Filed | Feb. 5, 1970 |
| [45] | Patented | Nov. 30, 1971 |
| [73] | Assignee | Biometrics, Inc. |
| | | Cambridge, Mass. |

[54] TECHNIQUES FOR OBJECTIVELY MEASURING VISUAL ACUITY
25 Claims, 7 Drawing Figs.

[52] U.S. Cl. .............................................. 351/32,
351/1, 351/6, 351/7, 351/34, 351/36, 351/37, 351/39
[51] Int. Cl. ............................................. A61b 3/02
[50] Field of Search ......................................... 351/6, 7, 32, 34, 36, 37, 39, 1

[56] References Cited
UNITED STATES PATENTS

| 3,469,903 | 9/1969 | Grichnik et al. ............... | 351/1 |
| 3,477,779 | 11/1969 | Mitsuishi et al. ............... | 351/32 |
| 3,506,342 | 4/1970 | Van Patten et al. ........... | 351/34 |

*Primary Examiner*—David Schonberg
*Assistant Examiner*—Paul A. Sacher
*Attorney*—Wolf, Greenfield & Sacks ABSTRACT: A technique for measuring either binocular or monocular visual acuity in which the subject's eye or eyes are stimulated by an oscillating target designed to induce an easily measured, large, regular, pendular movement of the subject's eyes. The image of the target is reduced dimensionally during the test until the subject no longer can resolve the markings on the target at which time the pendular, repetitive eye movements stop completely, thus providing a clear indication that the patient's threshold of resolution has been reached.

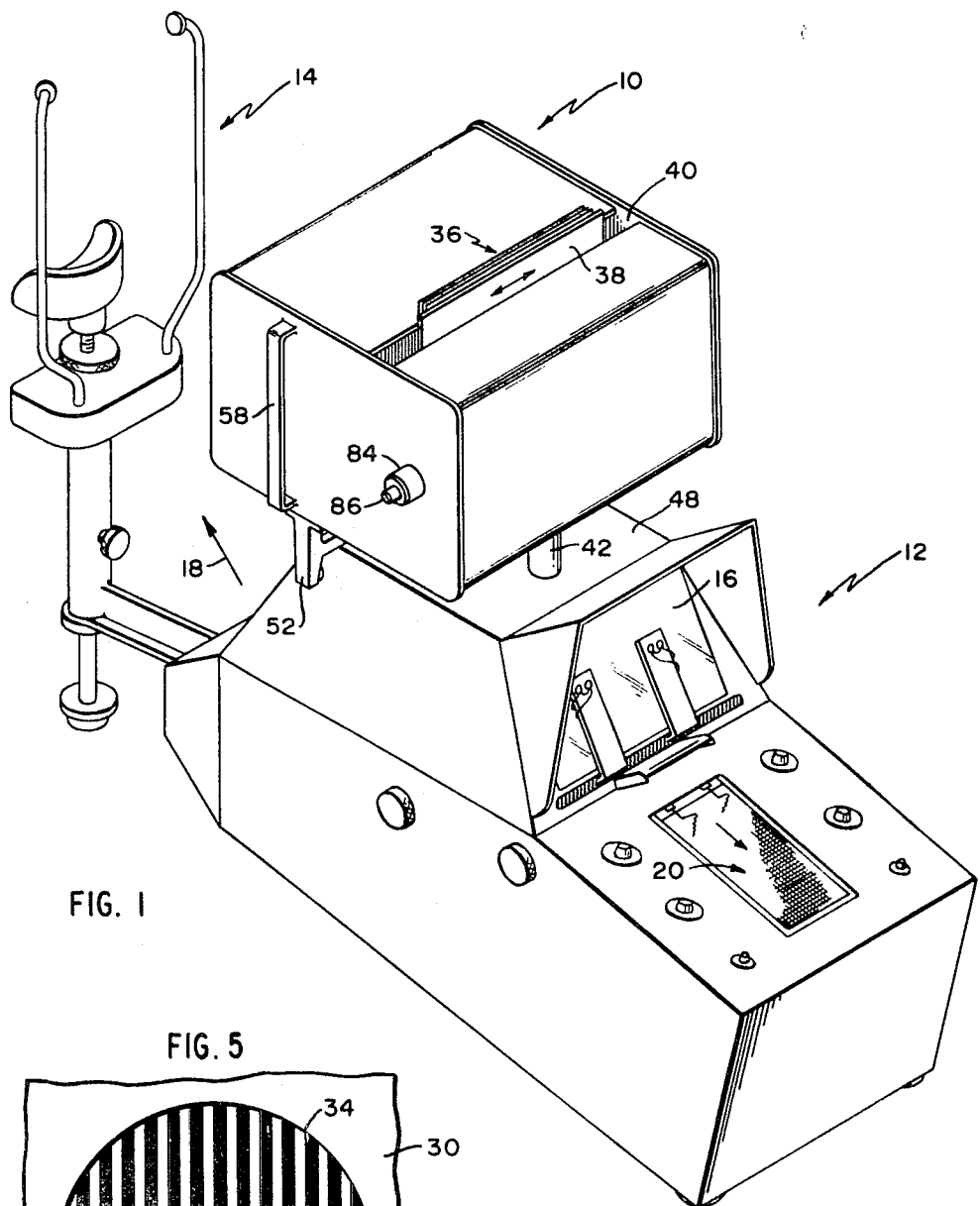

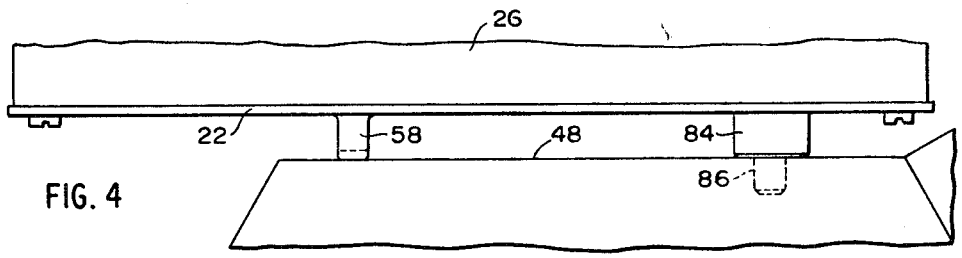
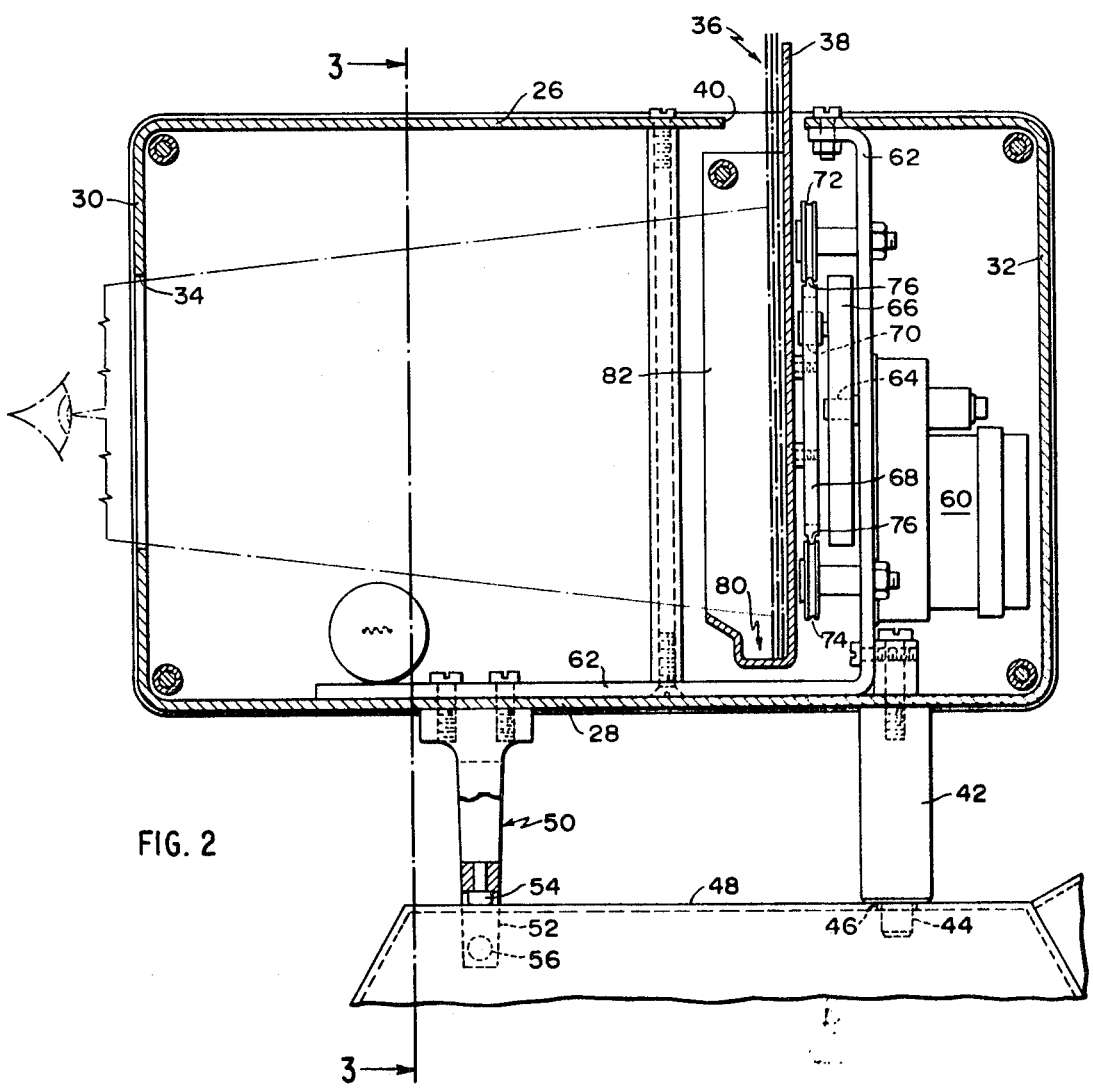

INVENTOR
MICHEL MILLODOT

TECHNIQUES FOR OBJECTIVELY MEASURING VISUAL ACUITY

BACKGROUND OF THE INVENTION

One of the commonly employed techniques for measuring, objectively, the visual acuity of a patient is to induce or arrest optokinetic nystagmus in the patient. Nystagmus is a term applied to eye movements which are unstable or oscillatory in nature. Optokinetic nystagmus is one type of nystagmus and results from continuous movement of a nonhomogeneous visual field past the subject, for example, as when watching telephone poles through the window of a moving train or observing a rotating striped cylinder.

In practicing the above technique the patient observes the target consisting of bars or dots. The target is moved in one direction continuously before the patient. The size of the continuously moving bars or dots is increased until optokinetic nystagmus is induced, and thus providing an indication of the threshold of a subject's visual acuity. Alternatively, the technique may begin with a condition of induced optokinetic nystagmus and then reduce the size of the target markings until the optokinetic nystagmus stops.

The foregoing technique often results in a number of difficulties. For example, the threshold at which the nystagmus is encountered often is difficult to discern. Frequently, this is because the amplitude of the nystagmus decreases as the size of the bars or dots on the moving target decreases. It is, therefore, difficult to tell with reliable precision just when the nystagmatic reaction begins or ends. Since the nystagmus amplitude decreases as the threshold is approached, the end point is often obscured by noise and other confusing signals. These difficulties are pronounced further by the fact that a number of people do not display optokinetic nystagmus and therefore cannot be tested by this technique.

SUMMARY OF THE INVENTION

The invention relates to a technique for measuring objectively visual acuity which avoids the difficulties heretofore presented when measuring the acuity with reference to the subject's optokinetic nystagmus. More particularly, the invention employs a technique in which the subject's eyes are induced to oscillate in a large pendular movement. The pendular movement is induced by a target which is oscillated to and fro before the subject. The markings on the targets which induce the pendular movement are decreased dimensionally and progressively until the subject's threshold of resolution is reached at which time the regular pendular movement terminates and is replaced by random eye movements as the subject unsuccessfully attempts to follow the target. This provides a definite indication of the patient's threshold of resolution. The pendular swings of the eyes, as they follow the oscillating target, are of both fixed amplitude and large throughout the series of targets used in the test. This makes it quite easy to detect with accuracy and precision just when the threshold of resolution has been reached. The technique operates independently of any nystagmatic condition which the patient may or may not display.

Briefly, the invention includes targets of black and white parallel bars arranged alternately and which are of equal width. The targets are printed on cards which are supported on a card carrier which is oscillated in the frontal plane. The card carrier is housed within a box having a window through which a part of the target is exposed to enable the patient to focus on the target and follow its reciprocating motion. As the test progresses, targets having bars spaced at a higher frequency are substituted. The amplitude of oscillation of the target does not vary so that the large pendular eye movement continues until the spatial frequency of the bars on the target is such that the patient can no longer resolve visually between the black and white bars. At that time the pendular eye movement stops. The amplitude of the pendular eye movement remains large and constant throughout the test. There is no progressive decrease in amplitude of eye movement as in previous nystagmatic techniques. Once the threshold of resolution has been reached the large pendular eye movement stops completely and quickly.

In the illustrative embodiment of the invention the spatial frequency of the target is varied by providing a plurality of targets or cards arranged in a stack in which the first exposed card in the stack has the widest black and white bars of progressively increasing frequency, with the last card having the highest frequency. The stack of cards is supported in the card holder with one end of the card stack protruding upwardly through an opening in the housing to enable the cards to be removed in succession as the test continues, thus exposing the next succeeding card having a higher spatial frequency of bars or stripes. The bars of each card are calibrated to subtend a given angle at the subject's pupil and may be converted into Snellen acuity convention (20/20=1 minute of arc).

The subject's eye movements may be monitored in a number of ways, for example, as with a device of the character described in U.S. Pat. application, Ser. No. 806,781, filed Mar. 10, 1969. By using the instant invention with the eye movement monitor disclosed in that application, immediate determination of the subject's visual acuity may be obtained as well as a permanent record of the test results for later reference.

It is among the general and primary objects of the invention to provide a technique for measuring the visual acuity of a subject objectively and with a high degree of accuracy.

It is a further object of the invention to provide a technique for determining a subject's visual acuity which is independent of the subject's subjective response and is automatic in that it requires essentially no interpretation on the part of the examiner.

A further object of the invention is to measure objectively a subject's visual acuity by inducing and monitoring large, clearly distinguishable pendular eye movements which stop or completely change character at the subject's threshold of resolution.

Yet another object of the invention is to provide a technique for measuring objectively a subject's visual acuity in which his threshold of resolution may be detected accurately and quickly.

A further object of the invention is to achieve the foregoing results by providing an oscillating target which the subject follows visually to produce the requisite pendular eye movement.

DESCRIPTION OF THE DRAWINGS

These and other objects and advantages of the invention will be apparent from the following detailed description thereof with reference to the accompanying drawings wherein:

FIG. 1 is an illustration of the measuring device mounted on an eye movement monitor with which it may be used;

FIG. 2 is a sectional view of the measurement device as seen from the plane 2—2 of FIG. 3;

FIG. 4 is a side elevation of the device resting in an alternate position on the monitor;

FIG. 5 is an illustration of the portion of the target as viewed by the subject;

Figure 3:
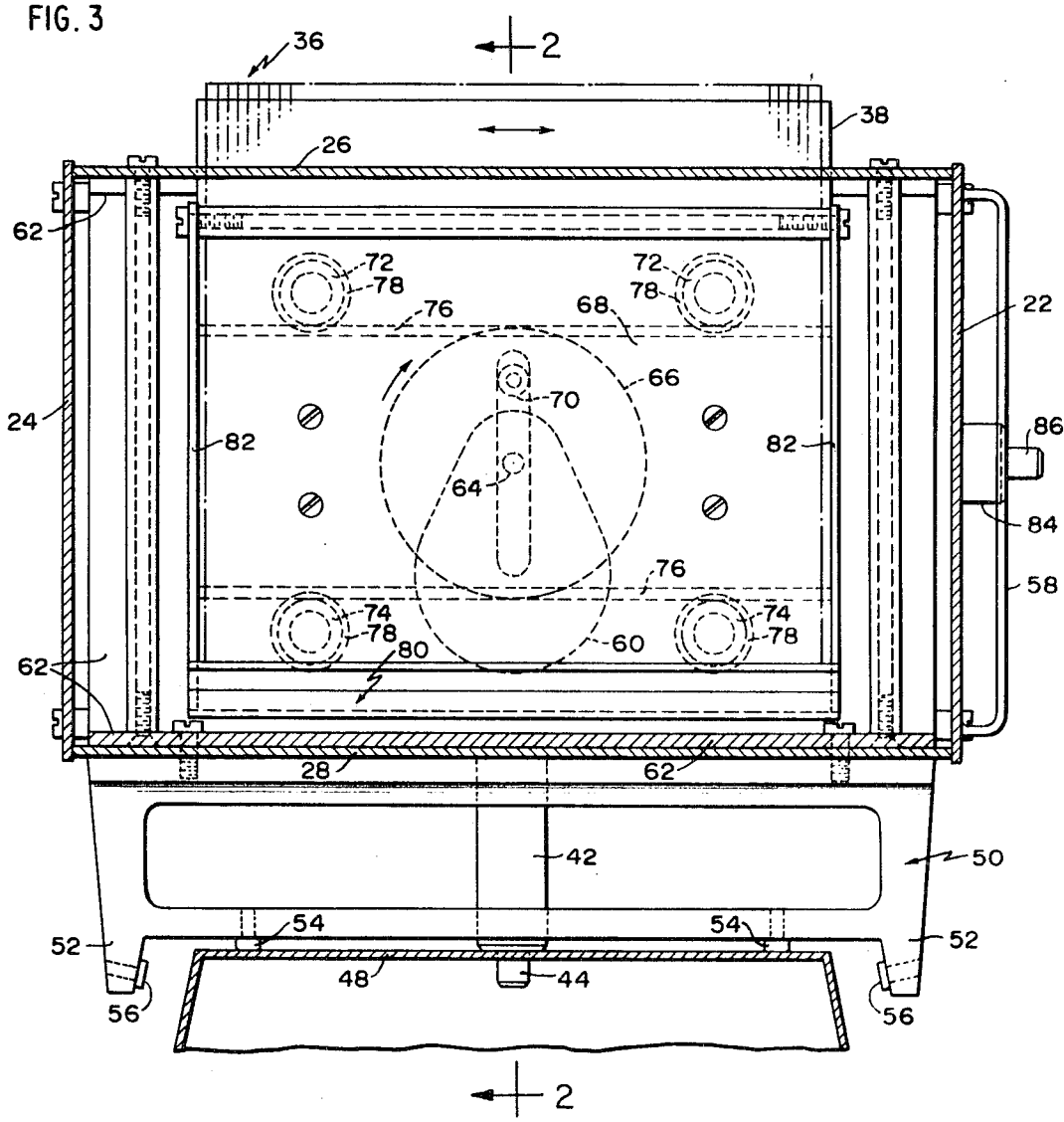
FIG. 3 is a sectional view of the measuring device as seen from the plane 3—3 of FIG. 2.

The invention is shown in FIG. 1 as being used with an eye position and movement monitoring device described more fully in copending U.S. Pat. application, Ser. No. 806,781 filed Mar. 10, 1969. In brief, the monitor 12 includes a head rest for support or support 14 to position the subject's head firmly and properly with respect to the monitor 12. The target is supported on top of the monitor 12 so that it may be viewed by the subject. The target consists of the acuity measuring device which is the subject of the invention.

The monitor 12 includes optical means by which the image of the subject's eyes are projected onto a screen 16 to provide the operator with an indication of the immediate position and movement of the subject's eyes. The subject's eyes may be illuminated by a light incorporated into the monitor 12 and which is directed upwardly toward the subject's face as indicated by the arrow 18 in FIG. 1. The monitor 12 also includes a recorder 20 which provides a permanent record of the patient's eye movement during the test.

The measuring device 10 is adapted to induce the large pendular movement in the subject's eyes. As shown in FIGS. 2, 3, and 4, the measuring device 10 includes a housing defined by sidewalls 22, 24, top and bottom walls 26, 28 and front and rear walls 30, 32. The front wall 30 which faces the patient includes a circular window 34 to enable the subject to see inside the device 10. The targets, which are imprinted on a stack of cards 36, are supported within the device 10 by means of a card holder, indicated generally by the reference character 38. A slot 40 is provided in the top wall 26 in alignment with the card holder 38 to enable the cards 36 to be inserted into and removed from the card holder 38. The cards supported within the holder 38 are illuminated by a small light bulb (15 watts is sufficient) so that the subject may see the markings on the cards 36 clearly through the window 34 in the front wall 30.

The cards 36 and card holder 38 are smaller in width than the width of the device 10 to enable the card holder 38 and cards 36 supported thereon to be oscillated to and fro in a horizontal direction as viewed in FIG. 2. The particular mechanism employed for effecting the oscillatory movement of the card holder is described more fully below.

The device 10 mounts atop the monitor 12 by a stud 42 which is secured to the bottom wall 28 of the device 10. The stud 42 includes a pin 44 which fits in a hole 46 formed in the top plate 48 of the monitor 12. A bracket 50 is secured and projects downwardly from the bottom wall 28 of the device 10 to provide a support for the front end of the device. The bracket 50 includes downwardly extending fingers 52 at its lateral ends which extend along and embrace the sides of the monitor. The bracket 50 is provided with a pair of glides 54 which bear on the top plate 48 of the monitor 12 and the fingers 52 include inwardly projecting stops 56 which are engageable with the sidewalls of the monitor 12. The parts are dimensioned so that when the device 10 is centered on the monitor 12 a clearance will exist between each of the stops 56 and its associated side of the monitor. This arrangement enables the device 10 to be positioned with respect to the subject so that he may view directly through the circular window 34 with either his left, right or both eyes depending whether the device is centered or moved against the right or left stops 56. The operator may pivot the forward end of the device 10 about the pin 44 and stud 42 within the limits defined by engagement of the stops 56 with the sides of the monitor in order to test the acuity of the left, right or both eyes of the subject. When testing only one eye, the other is occluded by an eye patch or similar device. Additionally, a side bracket 58 is provided along one of the sidewalls for a purpose later described.

The drive for oscillating the card holder 38 and supported card 36 includes a conventional electric motor 60 which is supported within the rearward portion of the device on a bracket 62 which extends along the bottom wall 28 and then upwardly toward the top wall 26 to which it is secured. The upwardly extending portion of the bracket 62 is located rearwardly of the slot 40 through which the cards 36 are inserted. The output shaft 64 of the motor 60 extends forwardly through the bracket 62 and is secured to a crank arm 66. The crank arm is connected, in turn, to a shuttle 68 by means of the crankpin 70, the shuttle 68 being mounted for lateral reciprocating motion in response to rotation of the crank arm. The card holder 38 is secured to the shuttle for a lateral reciprocating motion in unison therewith.

The shuttle 68 is mounted and guided for the above oscillatory motion by means of a pair of upper guide rolls 72 and a pair of lower guide rolls 74. The guide rolls are rotatably mounted to the upwardly extending portion of the bracket 62 and have grooves formed above their peripheries which receive the mating edges 76 of the shuttle 68. The guide rolls 72, 74 may include outer plastic tires 78 which are press fitted onto the rolls 72, 74 with the grooves being formed in the tires.

In operating the device a number of cards 36 are inserted, in a prearranged stack, through the slot 40 and into the card holder 38. The card holder 38 has a bottom, channel 80 and a pair of sidewalls 82 which cooperate to retain the stack of cards in place in the card holder 38 as it is oscillated. The card stack is arranged so that the card facing the subject has its alternating black and white bars at the lowest spatial frequency. Each card is selected with a spatial frequency corresponding to and which is calibrated with respect to the conventional acuity scales. With the subject's head supported firmly in the head rest the unit 10 is positioned on top of the monitor 12 by swinging the unit laterally about the pivot 44 until the subject views the outermost card 36 directly through the window 34 with either the desired eye, for monocular measurements, or both eyes for binocular measurements. If monocular measurements are being made, the eye not being tested is occluded. The outermost card is illuminated by the bulb. The motor then is operated to drive the shuttle 68 and card carrying card holder laterally in an oscillating, to and fro manner.

The window 34 exposes only a central portion of the card so that the image which the subject sees is that of black and white alternating bars oscillating horizontally within a steady circular window. As the subject's eye or eyes fixate on a series of bars, his eyes oscillate laterally as he follows the bars thus inducing a relatively large repetitive and easily recognizable pendular movement of his eyes. For example, the pendular movement may include a visual angle of approximately 7°. The subject's eye movement may be monitored directly on the screen 16 and, additionally, may be recorded permanently by the recorder 20. Once the subject has demonstrated that a card corresponding to a given acuity scale induces the pendular eye movement, the facing card 36 is removed upwardly through the slot 40 to expose the next succeeding card having a higher spatial frequency of bars or stripes. If the pendular movement is induced in the subject's eyes with this next card, thus demonstrating his ability to resolve the black and white bars on this card, this card is removed through the slot 40 to expose the next succeeding card having an even higher spatial frequency of black and white bars. The process is continued until a target is presented which is beyond the subject's threshold of resolution at which time he no longer can distinguish between the black and white bars. At this time, his pendular eye movements cease involuntarily and provide a precise and clear indication that the acuity threshold has been reached.

Figure 6A:
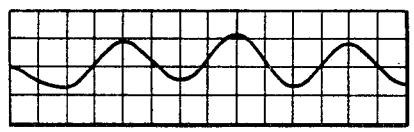
FIG. 6A is a chart illustrating the large regular pendular eye movements.
Figure 6B:
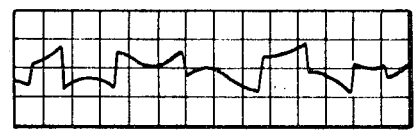
FIG. 6B is a chart illustrating the subject's random eye movement when he no longer is able to follow the oscillations of the target.

Once the patient's threshold of resolution has been reached, his natural tendency will be to continue to attempt to follow the oscillations of the target. His inability to follow these oscillations, however, is evidenced by irregular, random eye movements. FIG. 6A shows the regular oscillatory motion of the subject's eyes when he is able to follow the movement of the target. FIG. 6B illustrates the pattern of random eye movement when the subject's threshold of resolution has been reached at which time he no longer can follow the oscillating target. This technique is purely objective in that no conscious response is required from the subject. The threshold of resolution may be determined without requiring thought or conscious action on the part of the subject. The subject's visual acuity corresponds to the last card which induced the pendular movement in his eyes.

When the horizontal oscillation test is complete, the subject then may be tested again in the same manner except that the bars and cards are oscillated vertically. This vertical test is useful to determine the effect of astigmatism on visual acuity.

The vertical oscillation is obtained by reorienting the device 10 so that its sidewall 22 rests on the top plate 48 of the monitor 12. The cards 36 are supported by the lower of the sidewalls 82 which now is at the bottom of the unit. The unit, when in this second position, is located by means of a stud 84 and pin 86 which projects downwardly into the hole 46 formed in the top plate 48 of the monitor 12. The bracket 58 serves as a rest and bears directly on the top plate 48 to maintain the device 10 in a level position. The vertical oscillating test is conducted in the same manner as the horizontal test in that the cards are successively withdrawn through the slot 40 until the subject's pendular eye movement stops. This again can be performed both monocularly and binocularly.

It should be understood that the foregoing description is intended merely to be illustrative of the invention and that other embodiments and modifications will be apparent to those skilled in the art without departing from its spirit. For example, although the oscillation of the targets has been described as generated by a particular preferred mechanism, other mechanisms or devices may be employed to produce the same oscillatory effect. Additionally, a more sophisticated oscillatory device may be employed to effect both horizontal and vertical oscillation instead of requiring that the unit be reoriented to the second position described above. Further modifications may reside in the manner of presenting the oscillatory target to the subject. Although the oscillatory target has been described as consisting of a number of cards which may be removed individually, the oscillating target of dark and light alternating stripes may be provided by a motion picture projector or other means for simulating the target described herein. Furthermore, although the target has been described as projecting an image of alternating black and white parallel bars or stripes, other targets having different patterns may be substituted which induce the desired pendular movement of the subject's eyes. Although alternating black and white bars are preferred as a target image, the image may consist of variously colored bars or other patterns. As employed in the claims, the terms "light" and "dark" are intended to mean visually distinguishable markings.

Having thus described the invention what is claimed is:

1. A method for measuring a subject's visual acuity comprising:
   presenting to said subject a visual image having apparent dimensional characteristics corresponding to a selected standard of visual acuity which the subject is able to resolve;
   oscillating said image before said subject to induce a large, easily discernible pendular motion in at least one of said subject's eyes as they follow said oscillations;
   progressively changing said apparent dimensional characteristics of said image as seen by said subject to correspondingly more acute visual standards until said subject is unable to resolve visually said image and said oscillatory motion thereof whereby said pendular motion of the subject's eyes will terminate; and
   relating the characteristics of said image at the time of said termination of said pendular eye movement to the subject's visual acuity.

2. A method as defined in claim 1 further comprising:
   presenting said image to said subject in the form of alternating light and dark areas.

3. A method as defined in claim 2 further comprising:
   presenting said alternating light and dark areas to said subject in the form of parallel, alternating light and dark stripes.

4. A method as defined in claim 1 wherein said step of progressively changing said apparent dimensional characteristics of said image comprises:
   reducing progressively the apparent dimensional characteristics of said oscillating image.

5. A method as defined in claim 4 wherein said image is formed on a plurality of cards, each of said cards having an image smaller in dimensions than that of its preceding card and wherein said step of reducing said dimensions of said image comprises:
   presenting said cards to the subject's view individually beginning with the card having the largest dimensions of said image and thereafter substituting cards of the next smaller dimensional image.

6. A method as defined in claim 1 wherein said image is oscillated horizontally.

7. A method as defined in claim 6 wherein said image is oscillated vertically, said horizontal and vertical oscillation being performed independently of each other.

8. An apparatus for use in measuring objectively, a subject's visual acuity comprising:
   a target;
   means mounting said target for oscillation in front of the subject to induce a pendular movement in the subject's eyes in response to said oscillation;
   means for varying the apparent dimensional characteristics of the image of said target presented to the subject so that at least a portion of the image appears progressively smaller to said subject, the apparent variation in dimensional characteristics of said image corresponding, at any moment, to a selected standard of visual acuity;
   whereby when said dimensional characteristics have been varied to a degree wherein the subject's threshold of resolution is reached, his pendular eye movement will terminate thus providing a clear indication of his visual acuity.

9. An apparatus as defined in claim 8 further comprising:
   means for monitoring the pendular eye movement of said subject.

10. An apparatus as defined in claim 9 further comprising:
    means for recording the eye movement of said subject.

11. An apparatus as defined in claim 8 further comprising:
    a housing for enclosing said target; and
    a window formed in said housing to enable the subject to view only the central portion of said target.

12. An apparatus as defined in claim 8 further comprising:
    means mounting said housing for movement between positions in which said window may be aligned selectively with either one or both of the subject's eyes.

13. An apparatus as defined in claim 8 wherein said target comprises alternating light and dark areas.

14. An apparatus as defined in claim 13 wherein said alternating dark and light areas comprise:
    parallel light and dark alternating bars.

15. An apparatus as defined in claim 13 further comprising:
    said light and dark areas being of predetermined dimensions; and
    means locating said image at a predetermined distance from the subject's eyes.

16. An apparatus as defined in claim 15 further comprising:
    a head rest adapted to support the subject's head in a predetermined location.

17. An apparatus as defined in claim 8 wherein said image is formed on cards arranged in a stack, said cards in said stack having targets of different dimensions, said cards being arranged in said stack to be presented to the subject in a succession of decreasing dimensional magnitude.

18. An apparatus as defined in claim 17 further comprising:
    a housing;
    card holding means mounted in said housing for holding said stack of cards;
    said housing having a window formed therein to enable the facing card of said stack to be viewed by the subject;
    means enabling said facing card to be removed from said stack to present the next succeeding card to the subject's view; and
    means mounted within said housing for illuminating said facing card.

19. An apparatus as defined in claim 16 wherein said means enabling said facing card to be removed from said stack comprises:

a slot formed in said housing in registry with said card holding means; and said card holder supporting said stack of cards so that the end of each of said cards protrudes outwardly of said housing through said slot.

20. An apparatus as defined in claim 18 wherein said means mounting said target for oscillation comprises:

means mounting said card holder and cards supported thereon within said housing for reciprocating movement in a lateral direction; and drive means for effecting said movement.

21. An apparatus as defined in claim 20 wherein said means for mounting said card holder within said housing comprises:

a shuttle mounted within said housing for said lateral movement;

means for securing said card holder to said shuttle for movement in unison therewith; and a crank drive connected to said shuttle for driving said shuttle in said lateral oscillatory motion.

22. An apparatus as defined in claim 21 wherein said housing comprises a boxlike member having top and bottom walls, sidewalls and front and rear walls, said slot being formed in said top wall and wherein said means mounting said shuttle comprises:

a bracket secured within said housing between said slot and said rear wall;

upper and lower roller means rotatably mounted to said bracket on the forward side thereof;

said shuttle including upper and lower edges engageable with said upper and lower rollers to permit lateral oscillatory movement of said shuttle, said rollers and shuttle being effective to retain said shuttle edges in engagement with said rollers.

23. An apparatus as defined in claim 22 wherein said crank drive comprises:

a motor secured to the rearward face of said bracket, said motor having an output shaft protruding forwardly through said bracket;

a crank arm secured to the protruding end of said output shaft; and means connecting the end of said crank arm to said shuttle.

24. An apparatus as defined in claim 8 further comprising:

a housing including front and rear walls, sidewalls, and top and bottom walls, said front wall having a window formed therein, said target being mounted within said housing in a position to be viewed through said window;

a supporting surface;

a pin mounted to the rearward end of the bottom wall of said housing and projecting downwardly therefrom, said pin being receivable in a hole formed in the supporting surface;

a bracket secured to the bottom wall of the housing and extending downwardly therefrom, said bracket being located forwardly of said pin, said bracket including a pair of laterally spaced fingers extending downwardly therefrom at its ends, said fingers being spaced laterally a width greater than the widthwise dimension of said support and depending downwardly beyond said support whereby when said housing is disposed on said support with said pin inserted into the hole in said support, said housing may be pivoted angularly within the limits defined by engagement of the fingers on said bracket with their associated sides of said support to enable said window and target to be aligned with either or both of the subject's eyes.

25. An apparatus as defined in claim 24 further comprising:

a second bracket to one of said sidewalls; and a pin, secured to said sidewall rearwardly of said second bracket and projecting normally therefrom, said pin being receivable within said hole in said support whereby said housing may be reoriented on its side with said second bracket providing support for said housing.

* * * * *